United States Patent
Cook et al.

(10) Patent No.: US 10,128,555 B2
(45) Date of Patent: Nov. 13, 2018

(54) METALLIC WAVEGUIDE WITH A DIELECTRIC CORE THAT IS DISPOSED ON A NON-PLANAR OR IRREGULAR SURFACE OF A SUBSTRATE

(71) Applicant: TEXAS INSTRUMENTS INCORPORATED, Dallas, TX (US)

(72) Inventors: Benjamin S. Cook, Addison, TX (US); Juan Alejandro Herbsommer, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/374,248

(22) Filed: Dec. 9, 2016

(65) Prior Publication Data

US 2017/0093011 A1    Mar. 30, 2017

Related U.S. Application Data (63) Continuation of application No. 14/498,837, filed on Sep. 26, 2014, now Pat. No. 9,548,523.

(60) Provisional application No. 61/977,394, filed on Apr. 9, 2014.

(51) Int. Cl.
  *H01P 3/12* (2006.01)
  *H01P 3/16* (2006.01)
  *H01P 11/00* (2006.01)
  *H04B 1/03* (2006.01)
  *H04B 1/08* (2006.01)

(52) U.S. Cl.
  CPC ............... *H01P 3/122* (2013.01); *H01P 3/12* (2013.01); *H01P 3/16* (2013.01); *H01P 11/002* (2013.01); *H01P 11/006* (2013.01); *H04B 1/03* (2013.01); *H04B 1/08* (2013.01)

(58) Field of Classification Search
  CPC .. H01P 3/16; H01P 3/12; H01P 11/001; H01P 11/002; H01P 11/006
  USPC .............................................. 333/239; 29/600
  See application file for complete search history.

(56) References Cited

U.S. PATENT DOCUMENTS

| | | |
|---|---|---|
| 3,157,847 A | 11/1964 | Williams |
| 4,825,221 A | 4/1989 | Suzuki et al. |
| 6,185,354 B1 | 2/2001 | Kronz et al. |
| 6,960,970 B2 | 11/2005 | Elco |
| 9,484,614 B2 | 11/2016 | Herbsommer |
| 9,515,366 B2 | 12/2016 | Herbsommer et al. |
| 9,548,523 B2 * | 1/2017 | Cook et al. ............. H01P 3/122 |

OTHER PUBLICATIONS

"3D Printing," Wikipedia, pp. 1-35, available at http://en.wikipedia.org/w/index.php?title=3D_printing&oldid=624190184, dated Sep. 4, 2014 (35 pages).

* cited by examiner

*Primary Examiner* — Benny Lee
(74) *Attorney, Agent, or Firm* — Michael A. Davis, Jr.; Charles A. Brill; Frank D. Cimino (57) ABSTRACT

A digital system has a substrate having a top surface on which a waveguide is formed on the top surface of the substrate. The waveguide is formed by a conformal base layer formed on the top surface of the substrate, two spaced apart sidewalls, and a top conformal layer connected to the base layer to form a longitudinal core region. The waveguide may be a metallic or otherwise conductive waveguide, a dielectric waveguide, a micro-coax, etc.

16 Claims, 7 Drawing Sheets

METALLIC WAVEGUIDE WITH A DIELECTRIC CORE THAT IS DISPOSED ON A NON-PLANAR OR IRREGULAR SURFACE OF A SUBSTRATE

CROSS REFERENCE TO RELATED APPLICATION(S)

The present application claims priority to and incorporates by reference U.S. patent application Ser. No. 14/498,837, filed Sep. 26, 2014 (issued as U.S. Pat. No. 9,548,523 on Jan. 17, 2017), which claims priority to and the benefit of U.S. Provisional Application No. 61/977,394, filed Apr. 9, 2014.

FIELD OF THE INVENTION

This invention generally relates to wave guides for high frequency signals, and in particular to metallic waveguides with dielectric cores.

BACKGROUND OF THE INVENTION

In electromagnetic and communications engineering, the term "waveguide" may refer to any linear structure that conveys electromagnetic waves between its endpoints. The original and most common meaning is a hollow metal pipe used to carry radio waves. This type of waveguide is used as a transmission line for such purposes as connecting microwave transmitters and receivers to their antennas, in equipment such as microwave ovens, radar sets, satellite communications, and microwave radio links.

A dielectric waveguide employs a solid dielectric core rather than a hollow pipe. A dielectric is an electrical insulator that can be polarized by an applied electric field. When a dielectric is placed in an electric field, electric charges do not flow through the material as they do in a conductor, but only slightly shift from their average equilibrium positions causing dielectric polarization. Because of dielectric polarization, positive charges are displaced toward the field and negative charges shift in the opposite direction. This creates an internal electric field which reduces the overall field within the dielectric itself. If a dielectric is composed of weakly bonded molecules, those molecules not only become polarized, but also reorient so that their symmetry axis aligns to the field. While the term "insulator" implies low electrical conduction, "dielectric" is typically used to describe materials with a high polarizability; which is expressed by a number called the relative permittivity ($\epsilon k$). The term "insulator" is generally used to indicate electrical obstruction while the term "dielectric" is used to indicate the energy storing capacity of the material by means of polarization.

Permittivity is a material property that expresses a measure of the energy storage per unit meter of a material due to electric polarization (Joules/Volts$^2$)/meter. Relative permittivity is the factor by which the electric field between the charges is decreased or increased relative to vacuum. Relative permittivity is also commonly known as dielectric constant.

The electromagnetic waves in a metal-pipe waveguide may be imagined as travelling down the guide in a zig-zag path, being repeatedly reflected between opposite walls of the guide. For the particular case of a rectangular waveguide, it is possible to base an exact analysis on this view. Propagation in a dielectric waveguide may be viewed in the same way, with the waves confined to the dielectric by total internal reflection at its surface.

BRIEF DESCRIPTION OF THE DRAWINGS

Particular embodiments in accordance with the invention will now be described, by way of example only, and with reference to the accompanying drawings.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1:
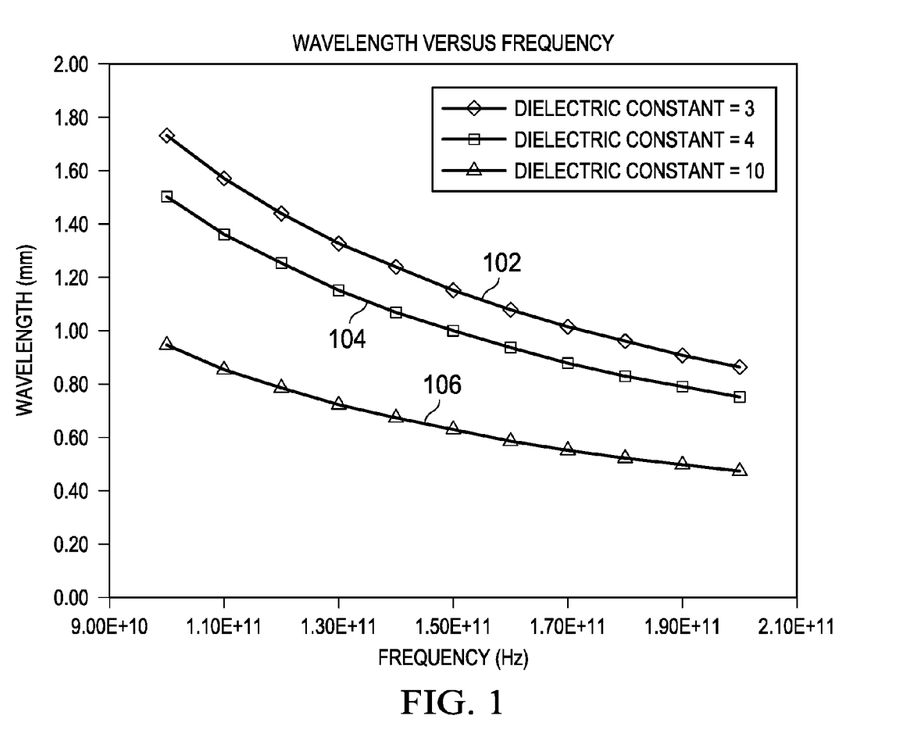
FIG. 1 is a plot of wavelength versus frequency through materials of various dielectric constants.

As frequencies in electronic components and systems increase, the wavelength decreases in a corresponding manner. For example, many computer processors now operate in the gigahertz realm. As operating frequencies increase to the sub-terahertz range, the wavelengths become short enough that signal lines that exceed a short distance may act as an antenna and signal radiation may occur. FIG. 1 is a plot of wavelength in mm versus frequency in Hz through materials of various dielectric constants. As illustrated by plot 102 which represents a material with a low dielectric constant of 3, such as a printed circuit board, a 100 GHz signal will have a wavelength of approximately 1.7 mm. Thus, a signal line that is only 1.7 mm in length may act as a full wave antenna and radiate a significant percentage of the signal energy. In fact, even lines of M10 are good radiators, therefore a line as short as 170 um may act as a good antenna at this frequency. Plot 104 in FIG. 1 has a dielectric constant of 4. Plot 106 in FIG. 1 has a dielectric constant of 10.

Waves in open space propagate in all directions, as spherical waves. In this way they lose their power proportionally to the square of the distance; that is, at a distance R from the source, the power is the source power divided by $R^2$. A wave guide may be used to transport high frequency signals over relatively long distances. The waveguide confines the wave to propagation in one dimension, so that under ideal conditions the wave loses no power while propagating. Electromagnetic wave propagation along the axis of the waveguide is described by the wave equation, which is derived from Maxwell's equations, and where the wavelength depends upon the structure of the waveguide, and the material within it (air, plastic, vacuum, etc.), as well as on the frequency of the wave. Commonly-used waveguides are only of a few categories. The most common kind of waveguide is one that has a rectangular cross-section, one that is usually not square. It is common for the long side of this cross-section to be twice as long as its short side. These are useful for carrying electromagnetic waves that are horizontally or vertically polarized.

For the exceedingly small wavelengths encountered for sub-THz radio frequency (RF) signals, dielectric waveguides perform well and are much less expensive to fabricate than hollow metal waveguides. Furthermore, a metallic waveguide has a frequency cutoff determined by the size of the waveguide. Below the cutoff frequency there is no propagation of the electromagnetic field. Dielectric waveguides may have a wider range of operation without a fixed cutoff point. However, a purely dielectric waveguide may be subject to interference caused by touching by fingers or hands, or by other conductive objects. Metallic waveguides confine all fields and therefore do not suffer from EMI (electromagnetic interference) and cross-talk issues; therefore, a dielectric waveguide with a metallic cladding may provide significant isolation from external sources of interference. Various types of metallic clad dielectric waveguides will be described in more detail below.

Various configurations of dielectric waveguides (DWG) and interconnect schemes are described in U.S. Pat. No. 9,515,366, entitled "Dielectric Waveguide Manufactured Using Printed Circuit Board Technology" and are incorporated by reference herein. Various antenna configurations for launching and receiving radio frequency signals to/from a DWG are also described therein and are incorporated by reference herein.

A flexible waveguide configuration may have a core member made from flexible dielectric material with a high dielectric constant and be surrounded with a cladding made from flexible dielectric material with a low dielectric constant. While theoretically, air could be used in place of the cladding, since air has a dielectric constant of approximately 1.0, any contact by humans, or other objects may introduce serious impedance mismatch effects that may result in signal loss or corruption. Therefore, typically free air does not provide a suitable cladding.

Figure 2:
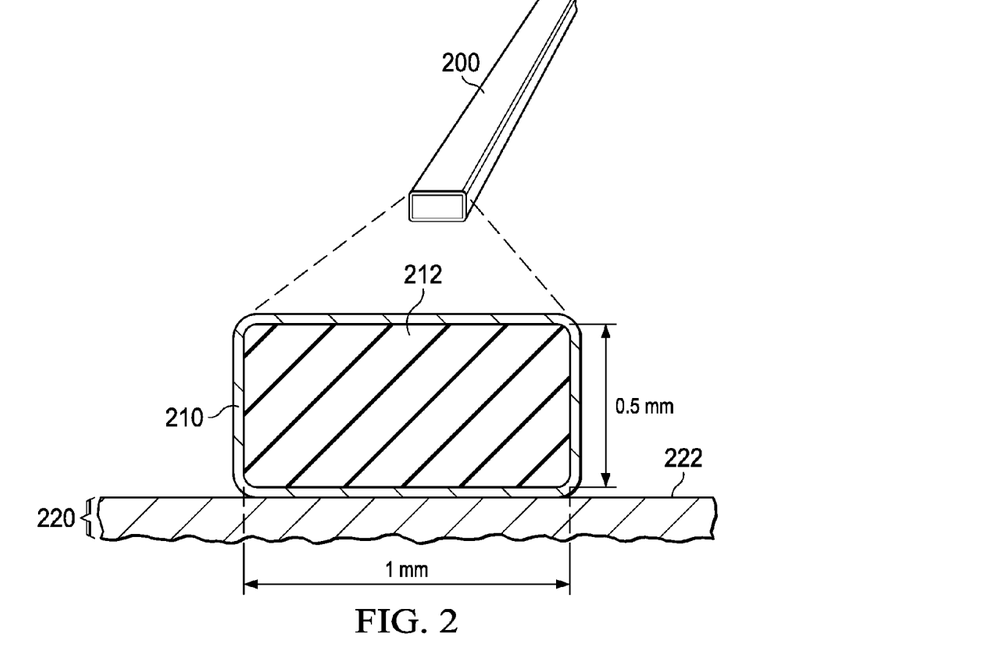
FIGS. 2-3 are illustrations of example metallic DWGs.

FIG. 2 illustrates a metallic DWG 200 that is configured as a thin ribbon of the core material 212 surrounding by the metallic cladding material 210. For sub-terahertz signals, such as in the range of 130-150 gigahertz, a core dimension of approximately 0.5 mm×1.0 mm works well.

In this example, metallic clad DWG 200 is fabricated on a surface 222 of a substrate 220. This substrate may range from an integrated circuit (IC) die, a substrate in a multi-chip package, a printed circuit board (PCB) on which several ICs are mounted, etc., for example. The substrate may be any commonly used or later developed material used for electronic systems and packages, such as: silicon, ceramic, Plexiglas, fiberglass, plastic, metal, etc., for example. The substrate may be as simple as paper, for example.

Figure 3:
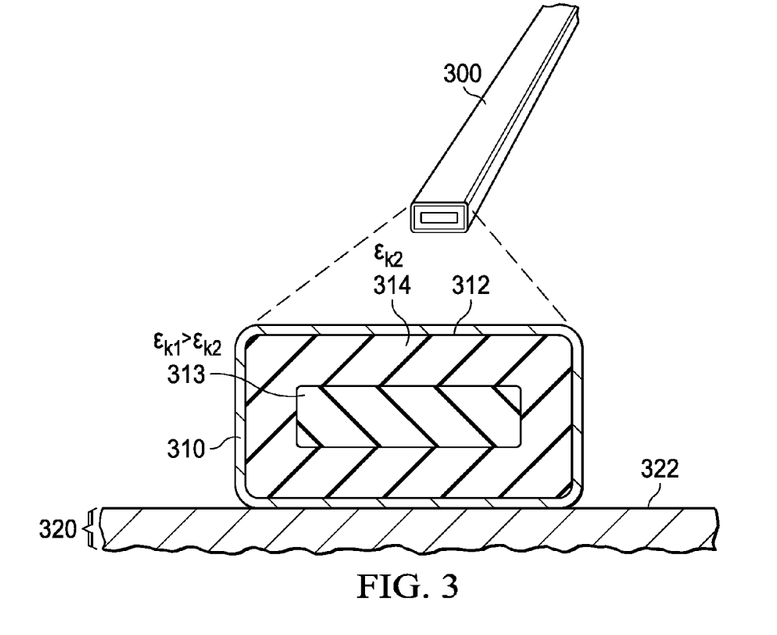

FIG. 3 illustrates a metallic DWG 300 that is configured as a thin ribbon of the core 312 surrounding by the metallic cladding material 310. In this example, core 312 is comprised of a thin rectangular ribbon of the core material 313 that is surrounded by a second layer of core material 314 to form a graded core 312. Core region 313 has a dielectric constant value of $\varepsilon k1$, while core region 314 has a dielectric constant value of $\varepsilon k2$, where $\varepsilon k1 > \varepsilon k2$. In another embodiment, graded core 312 may comprise more than two layers of core material, with each layer having a different relative dielectric constant value ranging from relative permittivity of $\varepsilon r1$-$\varepsilon rn$, for example. In another example, the graded core may be implemented in such a manner that the dielectric constant value gradually varies from a higher value in the center to a lower value at the outside edge. In this manner, a graded core may be provided that tends to confine the sub-THz frequency signal to the core material and thereby reduce cutoff effects that may be produced by the metallic cladding, for example.

In this example, metallic clad DWG 300 is fabricated on a surface 322 of a substrate 320. This substrate may range from an integrated circuit (IC) die, a substrate in a multi-chip package, a printed circuit board (PCB) on which several ICs are mounted, etc., for example. The substrate may be any commonly used or later developed material used for electronic systems and packages, such as: silicon, ceramic, Plexiglas, fiberglass, plastic, metal, etc., for example. The substrate may be as simple as paper, for example.

Figure 4:
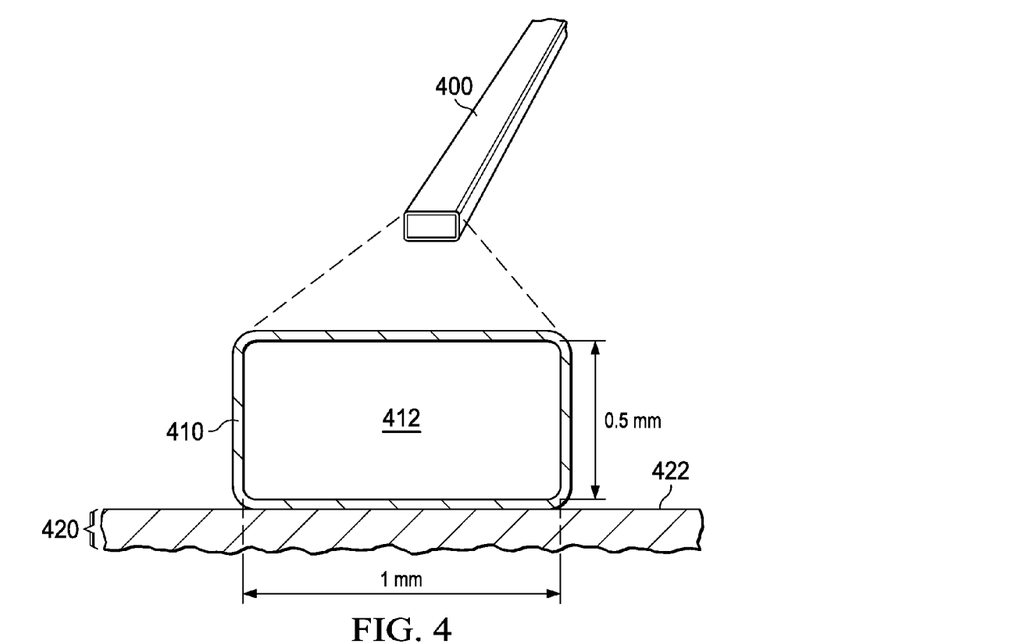
FIG. 4 is an illustration of a hollow core metallic waveguide.

FIG. 4 illustrates a metallic waveguide 400 that is configured with metallic sidewalls 410 that enclose a core 412 that may be hollow, for example. For sub-terahertz signals, such as in the range of 130-150 gigahertz, an air core dimension of approximately 0.5 mm×1.0 mm may work well.

In this example, metallic waveguide 400 is fabricated on a surface 422 of a substrate 420. This substrate may range from an integrated circuit (IC) die, a substrate in a multi-chip package, a printed circuit board (PCB) on which several ICs are mounted, etc., for example. The substrate may be any commonly used or later developed material used for electronic systems and packages, such as: silicon, ceramic, Plexiglas, fiberglass, plastic, metal, etc., for example. The substrate may be as simple as paper, for example.

Figure 5:
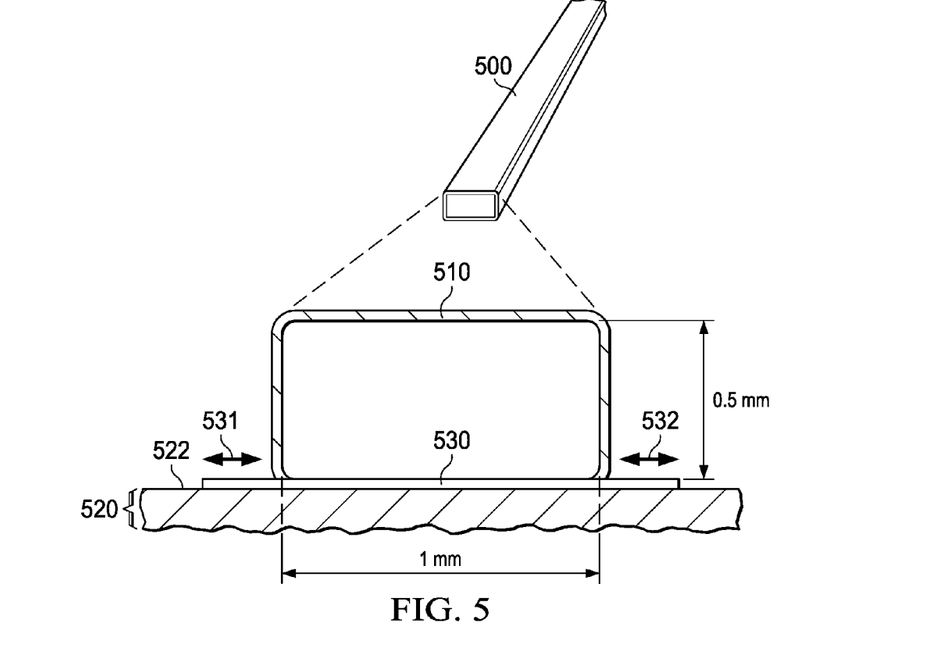
FIG. 5 illustrates another embodiment of any of the waveguides of FIGS. 2-4.

FIG. 5 illustrates another embodiment 500 of any of the waveguides of FIGS. 2-4. In this example, metallic waveguide 500 is fabricated on a surface 522 of a substrate 520. This substrate may range from an integrated circuit (IC) die, a substrate in a multi-chip package, a printed circuit board (PCB) on which several ICs are mounted, etc., for example. The substrate may be any commonly used or later developed material used for electronic systems and packages, such as: silicon, ceramic, Plexiglas, fiberglass, plastic, metal, etc., for example. The substrate may be as simple as paper, for example.

A bottom portion of waveguide 500 may be formed by a conductive layer 530 that may extend along surface 522 beyond a footprint of waveguide 500, as indicated at 531, 532, for example. The extent of regions 531, 532 may be minimal, or they may cover an extended portion of surface 522, or even the entire surface 522, for example. Conductive layer 530 may be metallic or may be a conductive non-metallic material, for example. FIG. 5 illustrates a metallic DWG 500 that is configured as a thin ribbon with metallic cladding material 510. In this example, the metallic DWG 500 is 1 mm wide and 0.5 mm tall.

The various DWG configurations described above may be fabricated using a printing process, such as an inkjet printer or other three dimensional printing mechanism. Fabrication of three dimensional structures using ink jet printers or similar printers that can "print" various polymer materials is well known and need not be described in further detail herein. For example, see "3D printing," Wikipedia, Sep. 4, 2014. Printing allows for the rapid and low-cost deposition of thick dielectric and metallic layers, such as 0.1 um-1000 um thick, for example, while also allowing for fine feature sizes, such as 20 um feature sizes, for example. Standard integrated circuit (IC) fabrication processes are not able to process layers this thick. Standard macroscopic techniques, such as machining and etching, typically used to manufacture dielectric waveguides and metallic structures may only allow feature sizes down to 1 mm, for example. These thicker printed dielectric and metallic layers on the order of 100 nm-1 mm which are made possible by inkjet printing enable waveguide operation at Sub-THz and THz frequencies. Previously optical frequencies could be handled using standard semiconductor fabrication methods while lower frequencies may be handled using large metallic waveguides; however, there was a gap in technology for fabricating waveguides for THz signals. Printing the waveguides directly onto the chip/package/board mitigates alignment errors of standard waveguide assemblies and simplifies the packaging process.

Figure 6:
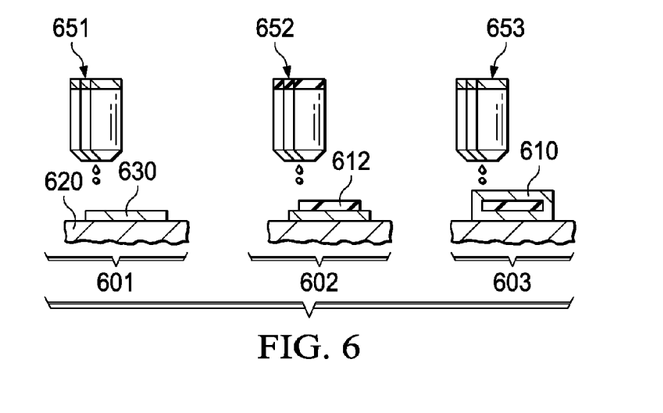
FIGS. 6-8 are process flow diagrams illustrating fabrication of various configurations of waveguides using a three dimensional printing process.

FIG. 6 is a process flow diagram illustrating fabrication of a metallic waveguide with a dielectric core similar to FIG. 2 using an ink jet printing process. In process step 601, an inkjet printing mechanism illustrated at 651 deposits a conducting layer 630 on a top surface of a substrate 620 using a known printing process. This conducting layer will form a bottom surface of the waveguide. Conducting layer 630 may be configured so that it only extends across the bottom region of the wave guide, as illustrated in FIG. 2, or it may be configured to extend beyond the walls of the waveguide, as illustrated in FIG. 5. Conducting layer 630 extends the length of the waveguide and conforms to the top surface of substrate 620.

In another embodiment, conducting surface 630 may be pre-fabricated on the substrate; for example, it may be a conductive layer that is laminated on the surface of substrate 620. In this example, unneeded portions of the conductive layer may be removed by etching, for example, or by other known fabrication techniques for creating patterned features on a substrate. In another embodiment, conductive layer 630 may be formed by diffusion of a layer onto substrate 620, or by sputtering a layer onto substrate 620, or by flooding the surface of substrate 620 with a conductive liquid or paste, etc., for example. In another embodiment, a stamped metal shape may be laminated or otherwise affixed to substrate 620 to form conductive layer 630

In process step 602, a core member 612 is formed by printing a dielectric material to form the core of the waveguide. Multiple passes of print-head 652 may be required to obtain a desired thickness for core 612. The printed dielectric may be composed of any dielectric material which can be deposited in thick layers, such as polymers, oxides, etc., for example. The dielectric material may be deposited as a single bulk material with relative permittivity $\varepsilon r1$, for example.

During process step 603, a conformal conductive coating is applied by print-head 653 to cover the top and sides of the waveguide. In this manner, core 612 is enclosed with a conductive cladding 610 to form a waveguide. Various conductive materials that can be printed in this manner may be used to form coating 610, such as: a conductive ink with metallic filler, a conductive polymer formed by ionic doping, carbon and graphite based compounds, conductive oxides, etc., for example.

Figure 7:
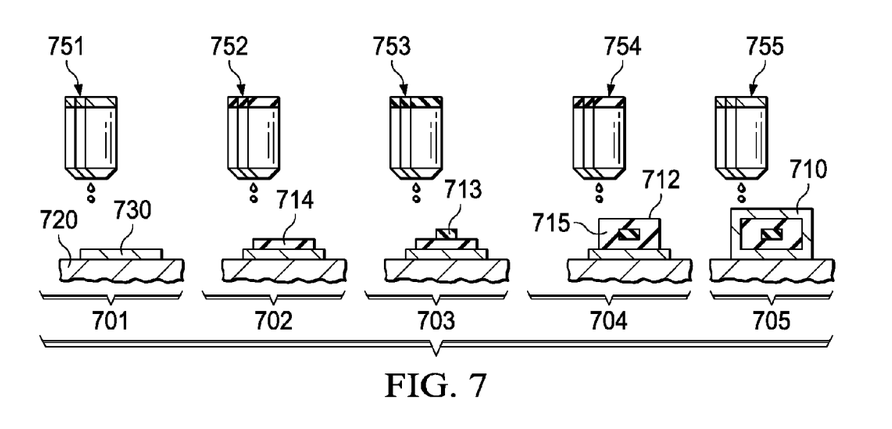

FIG. 7 is a process flow diagram illustrating fabrication of a metallic waveguide with a dielectric core similar to FIG. 3 using an ink jet printing process. In this example, a bottom conducting layer 730 is formed on a top surface of substrate 720 by a print-head 751 during process step 701, in a similar manner as described above with regard to FIG. 6. A first core layer 714 is formed by print-head 752 during process step 702 in a similar manner as described above.

During process step 703, a region 713 of the core is formed by print-head 753 using a dielectric material that has a different dielectric constant than the material used for layer 714. Then, in step 704 another layer 715 of dielectric material is applied by print-head 754 to complete the core member of the waveguide. In this example, three layers 714, 713, 715 are used to form core member 712. In this example, layer 713 has a relative dielectric constant value $\varepsilon r1$ that is greater than the relative dielectric constant value $\varepsilon r2$ of layers 714, 715. As discussed above, in this manner is graded core may be formed that allows the sub-THz signal to be more confined within the region of the dielectric core.

In another embodiment, additional layers may be used to form core member 712 using a range of relative permittivity of $\varepsilon r1$-$\varepsilon rn$, for example.

In another embodiment, the dielectric core may be formed in a such a manner that the dielectric core has a dielectric constant value that varies over at least two values along the longitudinal extent of the dielectric core. This may be done by printing different materials along the extent of the dielectric core, for example. This may be useful for matching impedance of the waveguide to another waveguide or to a transceiver antenna, for example.

During process step 705, a printed conductive coating is applied by print-head 755 to cover the top and sides of the waveguide. In this manner, core 712 is enclosed with a conductive cladding 710 to form a waveguide, as discussed in more detail above.

Figure 8:
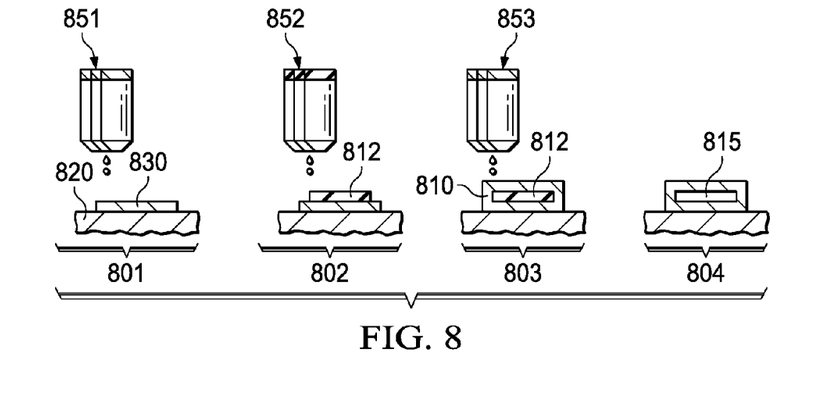

FIG. 8 is a process flow diagram illustrating fabrication of a hollow metallic waveguide with a dielectric core similar to FIG. 2 using an ink jet printing process. In this example, a bottom conducting layer 830 is formed on a top surface of substrate 820 by a print-head 851 during process step 801, in a similar manner as described above with regard to FIG. 7. A core layer 812 is formed by print-head 852 during process step 802 in a similar manner as described above. However, in this example core layer 812 may be an easily dissolved filler material, since it will be removed in process step 804. After the core layer 812 is removed, an air core 815 remains.

A conductive coating 810 is then formed around core member 812 during process step 803 by print-head 853. In this manner, a waveguide structure similar waveguide 200 in FIG. 2 is formed.

In this example, after conductive cladding 810 is formed, filler material 812 is removed in step 804 by dissolving the filler material using a suitable solvent. An array of holes may be formed in cladding 810 during process step 803, or later, to facilitate removal of filler material 812. Alternatively, filler material 812 may be a thermally sensitive material that may be removed by heating and melting or by heating and evaporation, for example.

For all of the waveguide embodiments described above, the waveguides may be printed arbitrarily long in a desired pattern in the plane of the substrate. Printed waveguides may conform to the surface topology of the substrate. If the substrate is flexible, the waveguide may also be flexible as long as the materials used to print the waveguide are also flexible.

Typically, using a lithographic process to form the dielectric core would produce essentially vertical sidewalls on the dielectric core. Deposition of a metallic material to cover the dielectric core may be difficult when the sides of the dielectric core are vertical. However, using an inkjet process to form the dielectric core and controlling the surface tension of the ink allows the slope, or angle, of the sidewalls of the printed waveguide to be controlled. Thus, the sidewalls of the dielectric core may formed with a slight inward slope, or may be formed perfectly vertical, depending on the needs of the next processing step. In this manner, deposition of the metallic sidewalls may be improved. This may not be an issue in other 3D printing processes, however.

Figure 9:
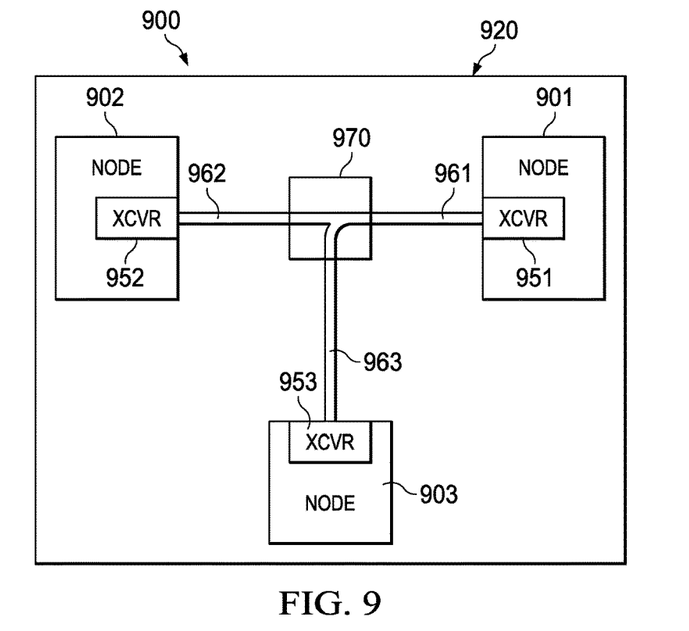
FIG. 9 is an illustration of three system nodes being interconnected with a metallic waveguide formed on a substrate.

FIG. 9 is an illustration of a system 900 that has at three nodes 901, 902, and 903 that are interconnected with metallic DWGs 961, 962, 963 using a signal divider 970 that are all formed on a substrate 920. An example signal divider is described in more detail in U.S. Pat. No. 9,484,614, entitled "Dielectric Waveguide Signal Divider", which is incorporated by reference herein. The three nodes may be a computing device and two peripheral devices or three computing devices, for example. The nodes may be any form of computing device, such as, but not limited to: a system on a chip (SOC), a rack mount, desk mount, or portable computer, a mobile user device such a notebook computer, a tablet computer, a smart phone, etc, for example. The nodes may be any type of peripheral device such as: a media storage device such as rotating or solid state disk drive, a modem or other interface to a high speed network, etc, for example. Each node may be an integrated circuit. All of the nodes may be mounted on a common circuit board substrate 920, for example.

Each node 901, 902, 903 may be an SOC or may contain a PWB (printed wiring board) or other type substrate on which are mounted one or more integrated circuits that produce or receive a sub-terahertz signal that is coupled to a DWG using transceivers (XCVR) 951, 952, 953, for example. The manner of coupling between the IC and the DWG may be implemented using any of the techniques described in more detail in U.S. Pat. No. 9,515,366, or later developed, for example.

Waveguides 961, 962, and 963 may be any form of flexible or rigid DWG as described in more detail above, for example. Various system embodiments may have more or fewer nodes interconnected with waveguides that are formed on a substrate, for example.

In some embodiments, one or more of segments 961-963 may have a metallic or otherwise conductive sidewalls, while one or more of segments 961-963 may be a dielectric waveguide in which the sidewall cladding is also a dielectric material having a lower dielectric constant value than the core region.

DWGs 961, 962, 963 and signal divider 970 may all be formed on a single substrate 920 using an ink jet or another three dimensional printing process, for example. In another embodiment DWGs 961, 962, 963 and signal divider 970 may all be formed on a single substrate using PWB fabrication techniques with plating and etching, for example. In another embodiment, DWGs 961, 962, 963 and signal divider 970 may be formed using diffusion techniques to produce different dielectric constant values in a polymer material, for example.

Figure 10:
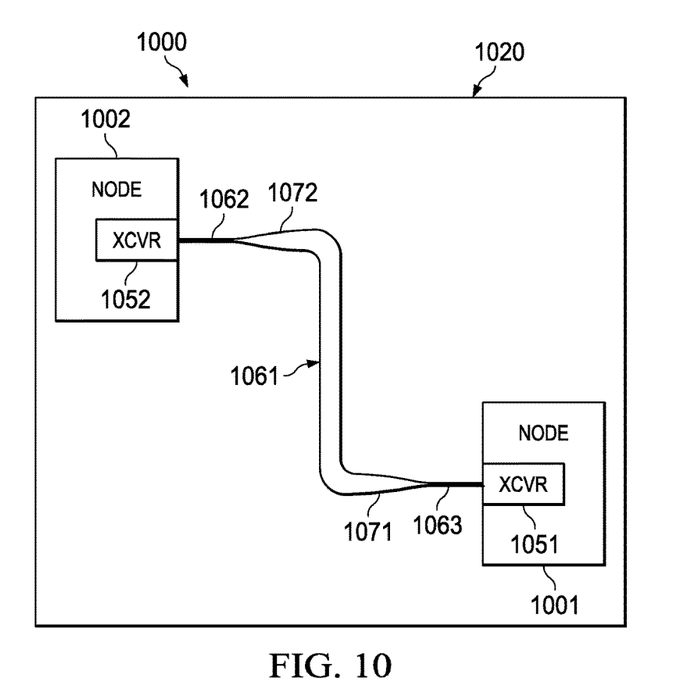
FIG. 10 is an illustration of a system in which the cross-section of a waveguide changes along its length.

FIG. 10 is an illustration of a system 1000 in which the cross-section of a waveguide changes along its length. In this example, two nodes 1001, 1002 with transceivers (XCVR) 1051, 1052 are mounted or otherwise formed on a surface of substrate 1020, as described in more detail above. Transceiver (XCVR) 1051 is coupled to transceiver (XCVR) 1052 by a waveguide that is also formed on the surface of substrate 1020 as described in more detail above.

In this example, the waveguide includes three segments 1061, 1062, 1063 that conform to the surface of substrate 1020. Since the waveguide segments may be fabricated using an inkjet process or other 3D printing process, the cross section of the segments may be easily varied to optimize transmission properties, for example. Typically, between each segment a transition zone 1071, 1072 may be provided to gradually transition from one waveguide configuration to the next. The transition zone may have a length that is greater than several wavelengths of a target signal, for example. Each segment 1061-1063 may have different properties, such as cross section size, (width×height), cross section aspect ratio (width vs height), dielectric constant, etc., for example.

In some embodiments, one or more of segments 1061-1063 may have a metallic or otherwise conductive sidewalls, while one or more of segments 1061-1063 may be a dielectric waveguide in which the sidewall cladding is also a dielectric material having a lower dielectric constant value than the core region, for example.

Figure 11:
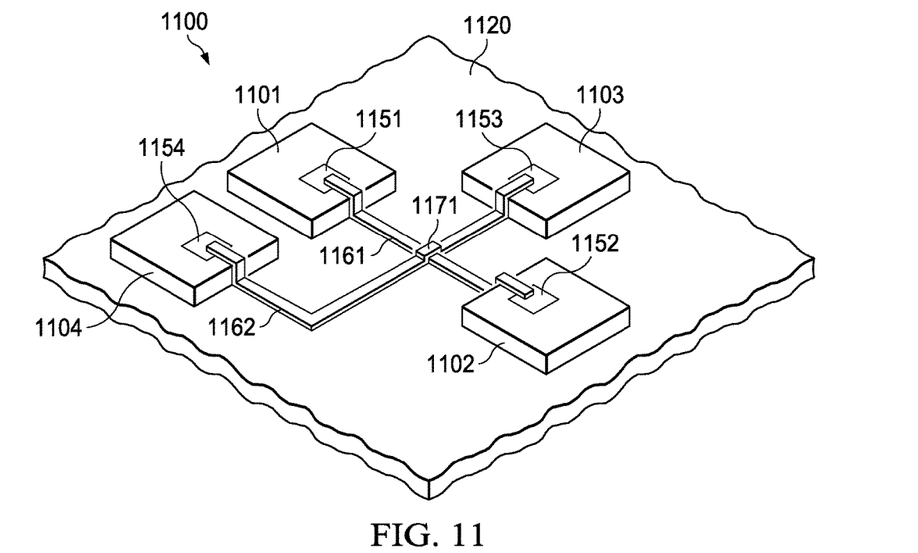
FIG. 11 is an illustration of a system illustrating various aspects of conformal waveguides.

FIG. 11 is an illustration of a system 1100 illustrating various aspects of conformal waveguides. In this example, four nodes 1101, 1102, 1103 and 1104 with transceivers 1151, 1152, 1153, and 1154 are mounted or otherwise formed on a surface of substrate 1120, as described in more detail above. Transceiver 1151 is coupled to transceiver 1152 by a waveguide 1161 that is also formed on the surface of substrate 1120 as described in more detail above. Likewise, transceiver 1153 is coupled to transceiver 1154 by a waveguide 1162 that is also formed on the surface of substrate 1120 as described in more detail above.

As described in more detail above, waveguides 1161, 1162 may be formed directly on the surface of substrate 1120 using an inkjet process or other form of 3D printing. This process allows the wave guides to be formed on a chip die of each node and to then follow over the edge of each die an onto the surface of substrate 1120. In a similar manner, one waveguide, such as 1162, may be routed over the top of another waveguide, such as 1161, as indicated at 1171, for example.

In this manner, a wide degree a freedom is available to route multiple waveguides on a surface of the substrate, and to cross over other waveguides or other physical features that are present on the surface of the substrate.

Figure 12:
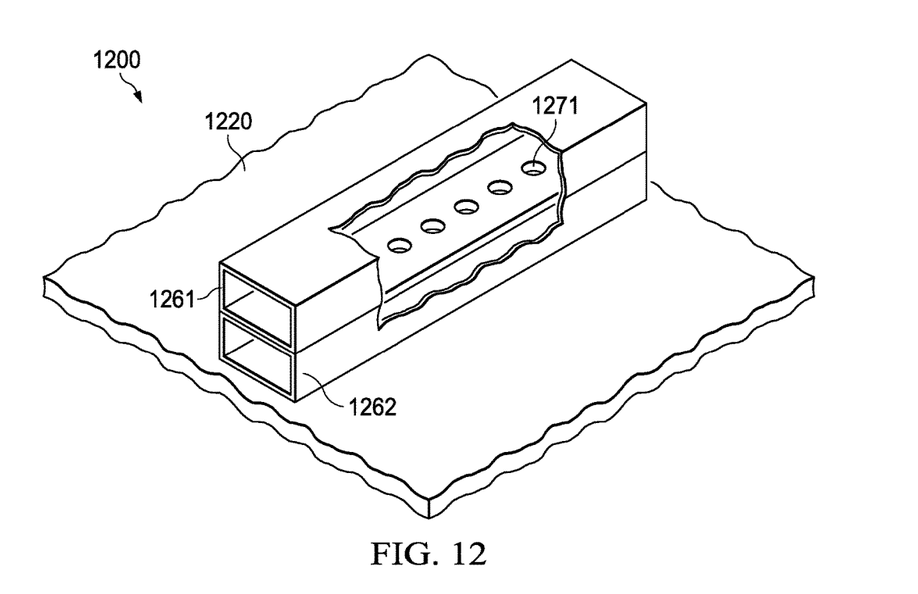
FIG. 12 is an illustration two waveguides that are stacked.

FIG. 12 is an illustration of a system 1200 of two waveguides 1261, 1262 that are stacked on a substrate 1220. Due to the digital nature of printing waveguides, multiple waveguides may be printed on top of each other, next to each other, overlapping, etc. This allows flexibility to not only create 3D signal routing schemes, but also create couplers, filters, etc. This may be done by repeating the steps illustrated in FIGS. 6-8 for each additional layer of waveguide, for example.

In this example, a set of holes 1271 may be formed between waveguide 1261 and 1262 during the printing process by simply omitting material to form each hole. In this manner, a signal propagating along waveguide 1261 may be coupled into waveguide 1262, or vice versa, for example.

Figure 13:
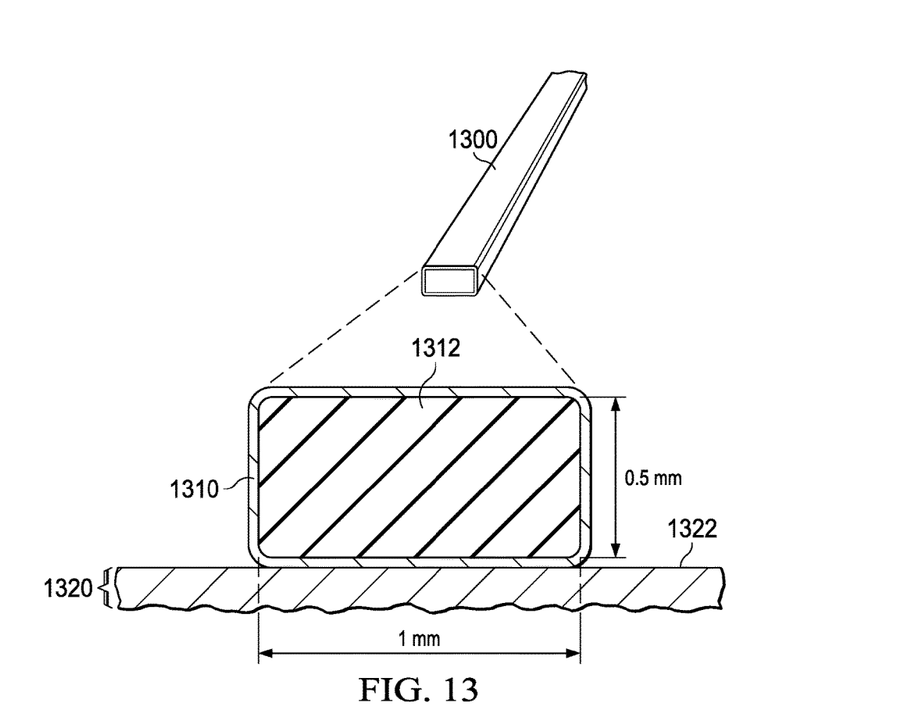
FIG. 13 is an illustration of a dielectric waveguide formed on a substrate.

FIG. 13 illustrates a DWG 1300 that is configured as a thin ribbon of the core material surrounding by the cladding material. DWG may be fabricated conformably onto surface 1322 of substrate 1320 using the inkjet printing process or other 3D printing process described with regard to FIG. 6-8, for example. In this example, a thin rectangular ribbon of the core material 1312 is surrounded by the cladding material 1310. For sub-terahertz signals, such as in the range of 130-150 gigahertz, a core dimension of approximately 0.5 mm×1.0 mm works well.

Printing DWG 1300 directly onto the chip/package/board 1320 mitigates alignment errors of standard waveguide assemblies and simplifies the packaging process.

Figure 14:
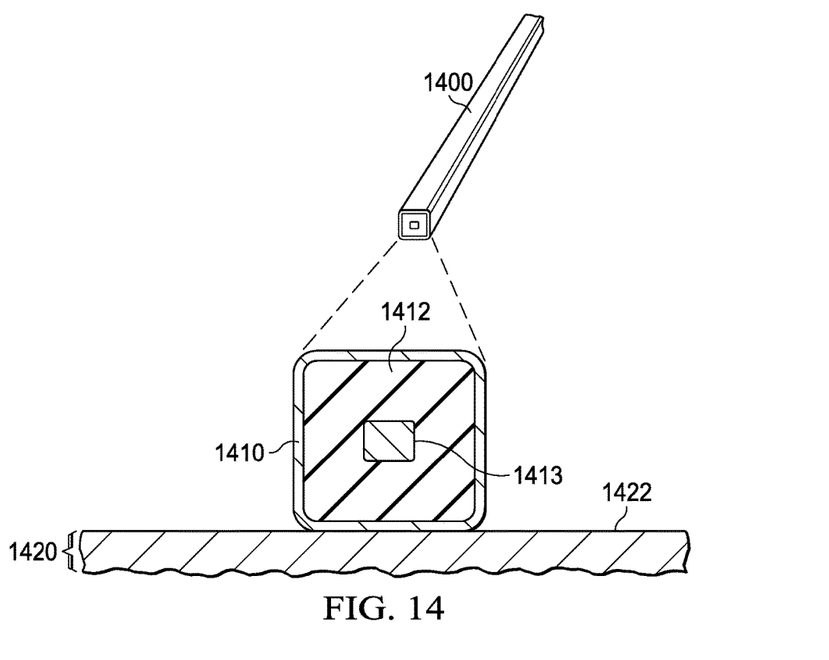
FIG. 14 is an illustration of a micro-coaxial structure formed on a substrate.

FIG. 14 is an illustration of a micro-coaxial structure 1400 formed on a surface 1422 of a substrate 1420. Micro-coaxial structure 1400 may be fabricated conformally onto surface 1422 of substrate 1420 using the inkjet printing process or other 3D printing process described with regard to FIG. 7, for example. In this example, a thin ribbon of the conductive core material 1413 is surrounded by an insulative material 1412, which is in-turn surrounded by a metallic or otherwise conductive cladding material 1410.

As shown by the above descriptions and examples, multiple electronic devices may be easily interconnected to provide sub-terahertz communication paths between the electronic devices by using the techniques described herein.

Printable metallic waveguides on top of a chip, package, or board may be processed onto nearly any substrate (silicon, Plexiglas, plastic, paper, etc.). Printed dielectric layers on the order of 100 nm-1 mm which are made possible by inkjet printing enable waveguide operation at Sub-THz frequencies; previously only optical frequencies could be reached using standard fabrication methods. A metallic or otherwise conductive shell provides isolation over standard dielectric waveguides.

Thus, extremely low-cost and low-loss sub-THz signal routing waveguides may be printed onto nearly any substrate. Printing the waveguides directly onto the chip/package/board mitigates alignment errors of standard waveguide assemblies and simplifies the packaging process.

Other Embodiments

While the invention has been described with reference to illustrative embodiments, this description is not intended to be construed in a limiting sense. Various other embodiments of the invention will be apparent to persons skilled in the art upon reference to this description. For example, while a metallic waveguide has been described herein, another embodiment may use a non-metallic conductive material to form the top, bottom and sidewalls of the wave guide, such as: a conductive polymer formed by ionic doping, carbon and graphite based compounds, conductive oxides, etc., for example. As used herein, the term "conductive waveguide" refers to a waveguide having either metallic or non-metallic conductive sidewalls.

While metallic or otherwise conductive waveguides are described herein, the inkjet and 3D printing techniques described herein may also be used to form non-conductive DWGs, micro-coaxial structure, etc., for example, that conform to a surface of a substrate.

The substrate on which a conductive waveguide is formed may be rigid or flexible, planar or non-planar, smooth or irregular, etc., for example. Regardless of the topology of the substrate, the conductive waveguide may be formed on the surface of the substrate and conform to the topology of the surface by using the additive processes described herein.

While dielectric cores with a rectangular cross section are described herein, other embodiments may be easily implemented using the printing processes described herein. For example, the dielectric core may have a cross section that is rectangular, square, trapezoidal, cylindrical, oval, or many other selected geometries. Furthermore, the processes described herein allow the cross section of a dielectric core to change along the length of a waveguide in order to adjust impedance, produce transmission mode reshaping, etc., for example.

In some embodiments, the substrate may be removed after forming a waveguide using the inkjet printing or other 3D printing process by dissolving the substrate with an appropriate solvent or melting a heat sensitive substrate, for example. In this manner, a free standing waveguide that may have a complicated shape may be formed using the ease of fabrication and optional material variations available as described herein.

The dielectric core of the conductive waveguide may be selected from a range of approximately 2.4-12, for example. These values are for commonly available dielectric materials. Dielectric materials having higher or lower values may be used when they become available.

While formation of a conductive waveguide by directly printing the waveguide onto the substrate using a layer-by-layer additive fabrication technique such as inkjet-printing is described herein, other additive techniques such as screen-printing, flexographic printing, or 3D printing may also be used.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A system comprising:
    a substrate having a surface, the surface of the substrate being non-planar; and
    a waveguide formed on the surface of the substrate, the waveguide comprising: a conformal base layer formed on the surface of the substrate; and a conformal top layer and two spaced apart sidewalls connected to the base layer to form a longitudinal core region.

2. The system of claim 1, wherein the core region is a dielectric core comprising a dielectric material.

3. The system of claim 2, wherein the dielectric core is a graded dielectric core comprising two or more longitudinal regions each having a different dielectric constant value.

4. The system of claim 2, wherein the dielectric material has a dielectric constant value that varies over at least two values along the longitudinal extent of the dielectric core.

5. The system of claim 2, wherein the dielectric material has a dielectric constant value selected from a range of approximately 2.4-12.

6. The system of claim 1, wherein the conformal base layer extends beyond the sidewalls.

7. The system of claim 1, wherein at least one of the conformal base layer, the sidewalls, and the conformal top layer is metallic.

8. The system of claim 1, further comprising:
a transmitting device coupled to the waveguide and operable to launch a radio frequency (RF) signal into the waveguide; and
a receiving device coupled to the waveguide and operable to receive a portion of the RF signal from the waveguide.

9. The system of claim 8, wherein the transmitting device and the receiving device are mounted on the surface of the substrate.

10. The system of claim 1, wherein the core region is hollow.

11. The system of claim 1, wherein the surface of the substrate is irregular.

12. A method for forming a waveguide, the method comprising:
forming a base layer for the waveguide on a surface of a substrate, the surface of the substrate being irregular, and the base layer being formed to conform to the irregular surface of the substrate;
forming an elongated core region for the waveguide on the base layer;
forming a conformal top layer and sidewalls surrounding the elongated core region and in contact with the base layer.

13. The method of claim 12, wherein the base layer, the sidewalls, and the top layer are formed by three dimensional printing onto the surface of the substrate.

14. The method of claim 12, further comprising:
removing the elongated core region after forming the sidewalls and the conformal top layer.

15. The method of claim 12, wherein forming the elongated core region comprises forming a graded core region having two or more different dielectric constant values.

16. The method of claim 12, wherein the base layer is formed to extend beyond a footprint of the waveguide.

* * * * *